Sept. 21, 1943.   T. R. JAMES   2,330,124
APPARATUS FOR WAXING CARTONS
Original Filed Oct. 12, 1940   14 Sheets-Sheet 2

Inventor
Thomas R. James
By Arthur R. Maybie
Atty.

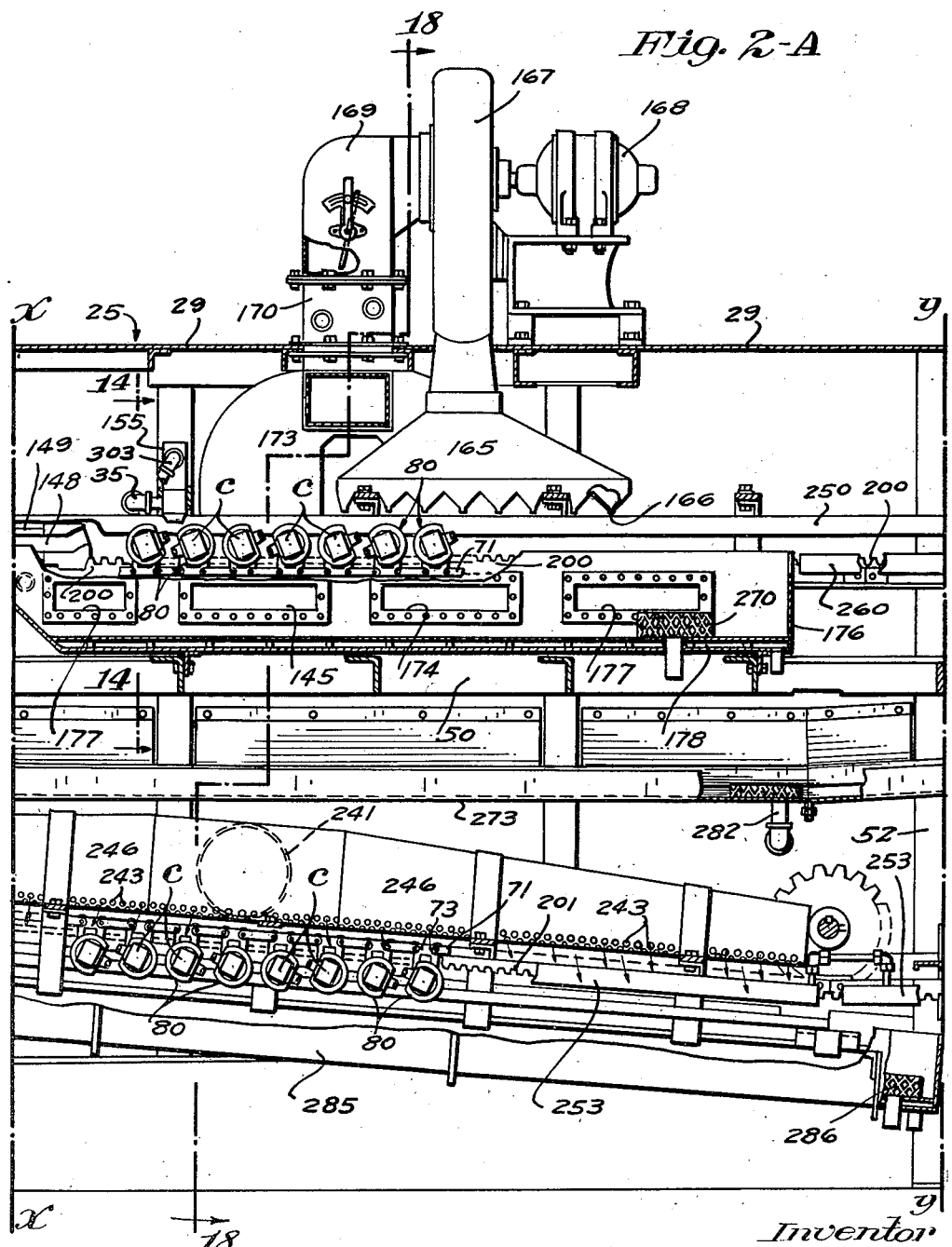

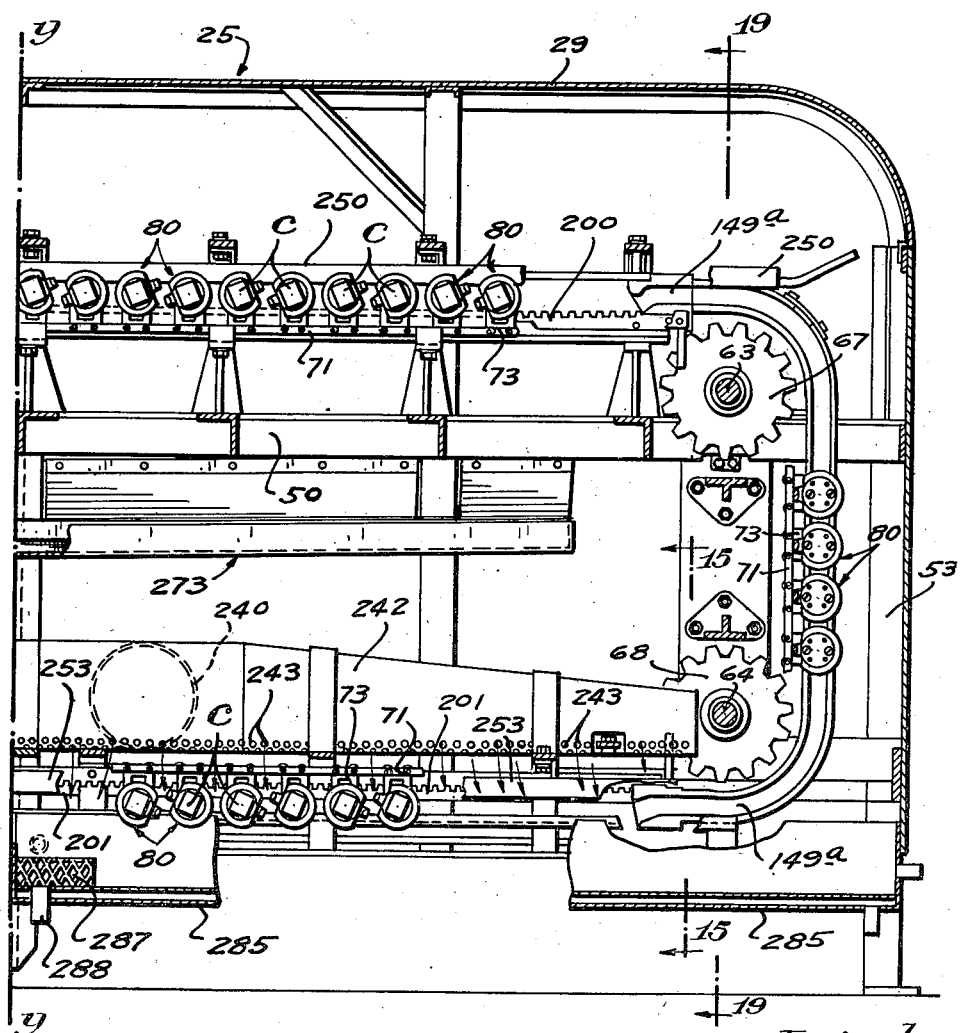

Sept. 21, 1943. T. R. JAMES 2,330,124
APPARATUS FOR WAXING CARTONS
Original Filed Oct. 12, 1940   14 Sheets-Sheet 5
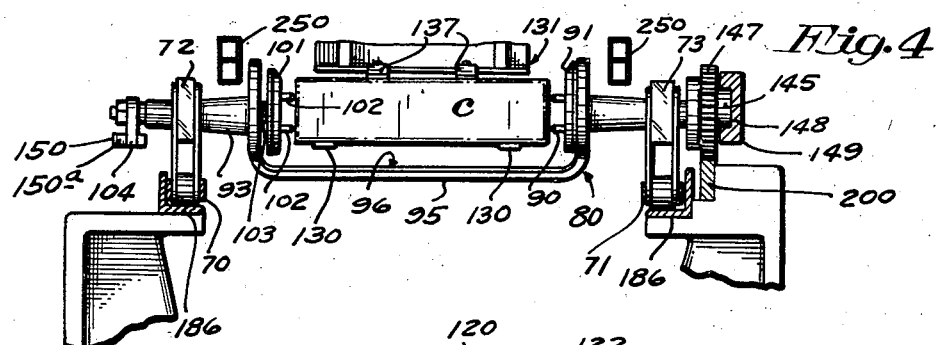
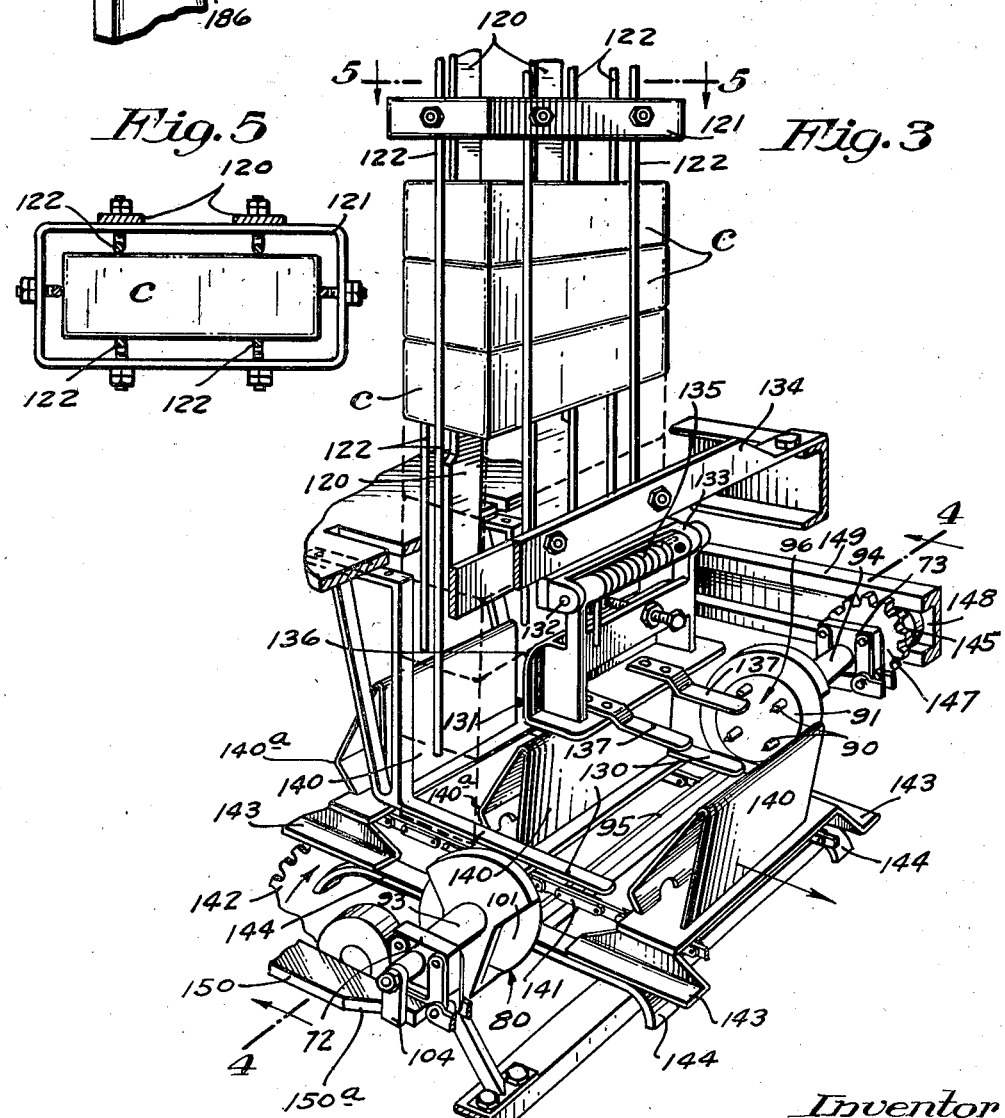
Inventor
Thomas R. James
By Arthur R. Uby
Atty.

Sept. 21, 1943.    T. R. JAMES    2,330,124
APPARATUS FOR WAXING CARTONS
Original Filed Oct. 12, 1940    14 Sheets-Sheet 6
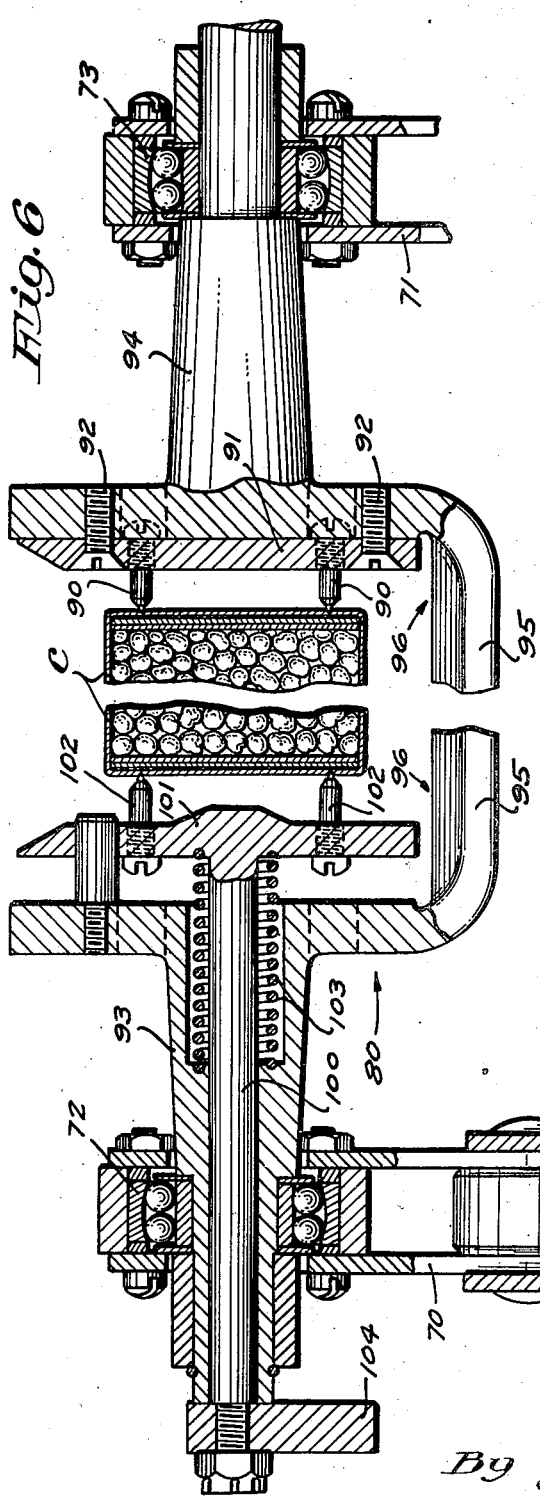
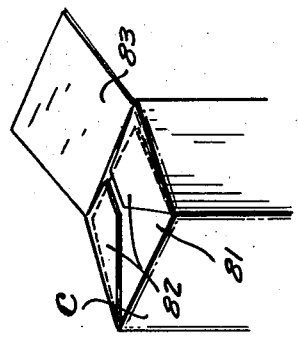
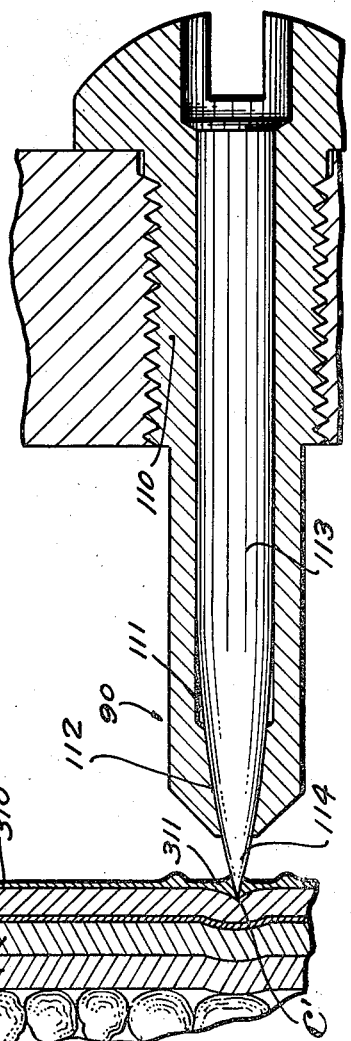
Inventor
Thomas R. James
By Arthur R. Urby
Atty.

Sept. 21, 1943.  T. R. JAMES  2,330,124
APPARATUS FOR WAXING CARTONS
Original Filed Oct. 12, 1940   14 Sheets-Sheet 7
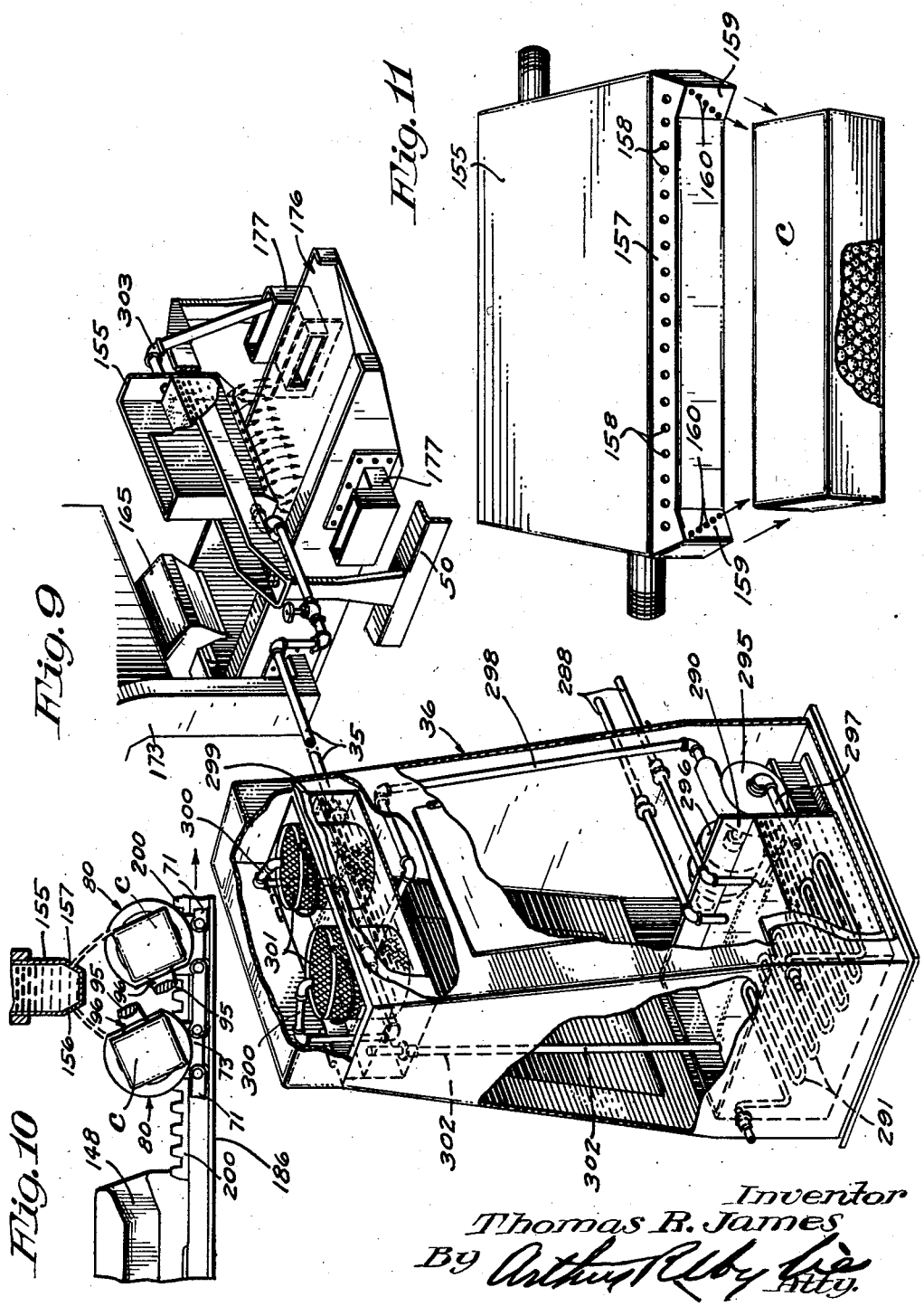
Inventor
Thomas R. James
By Arthur R. Irby
Atty.

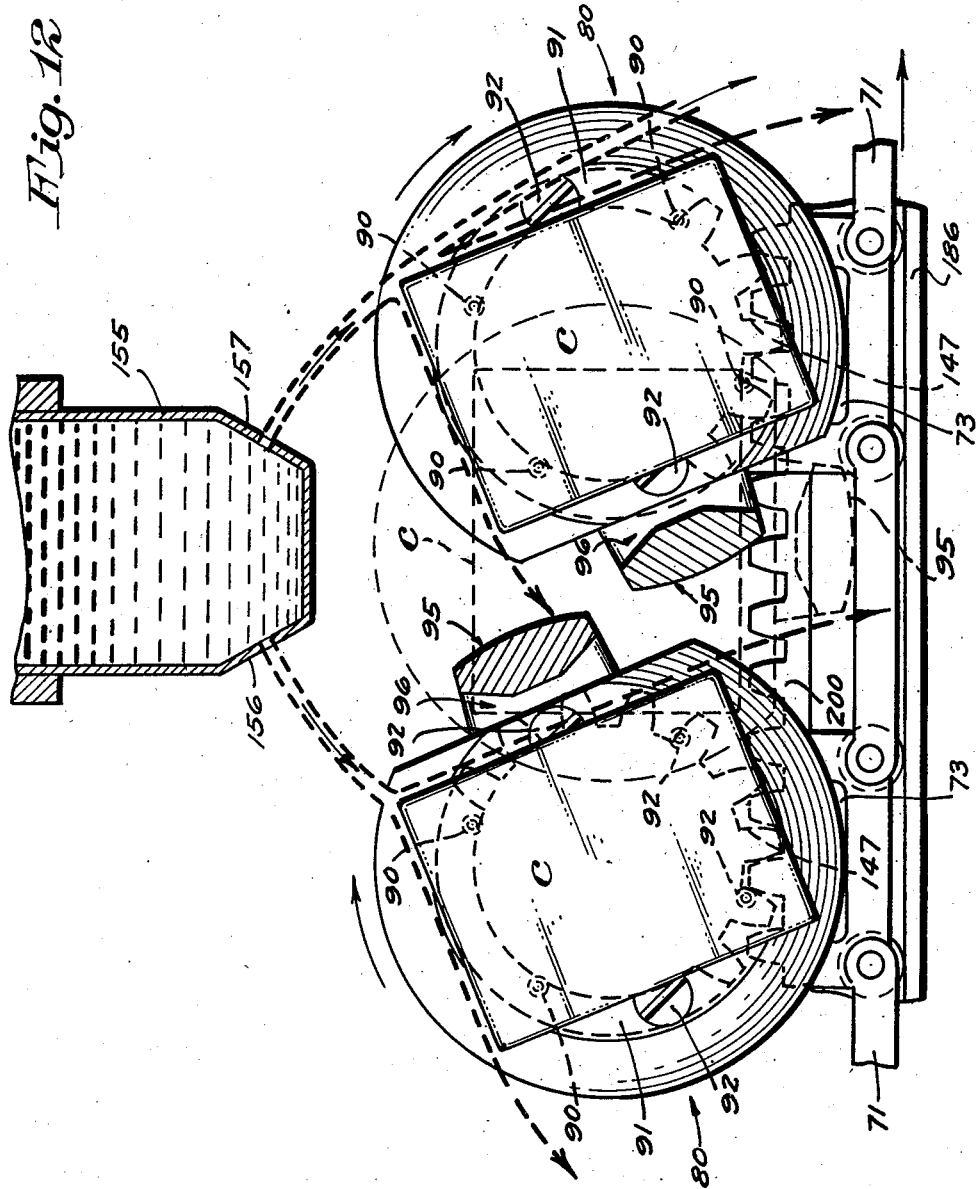

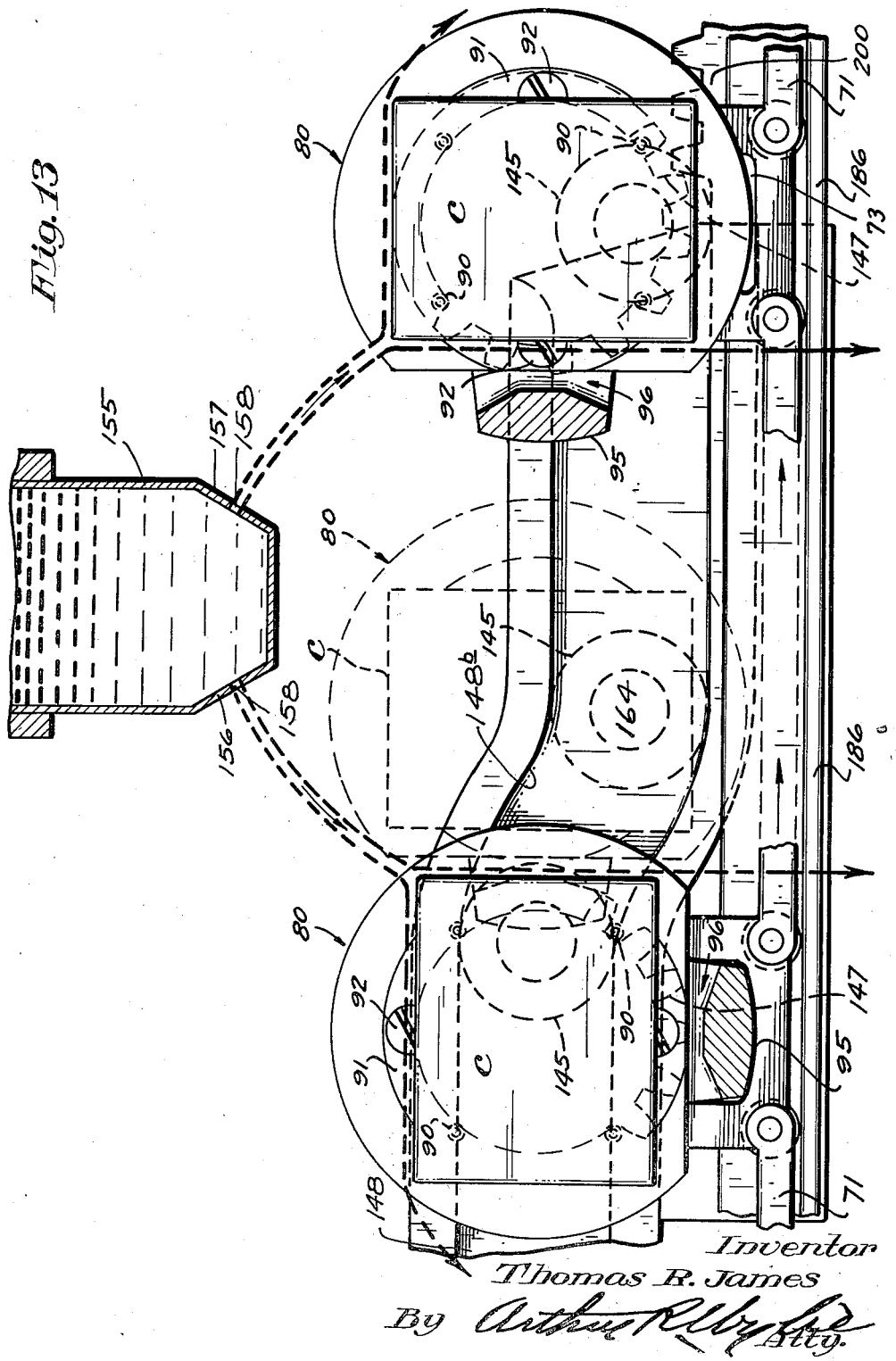

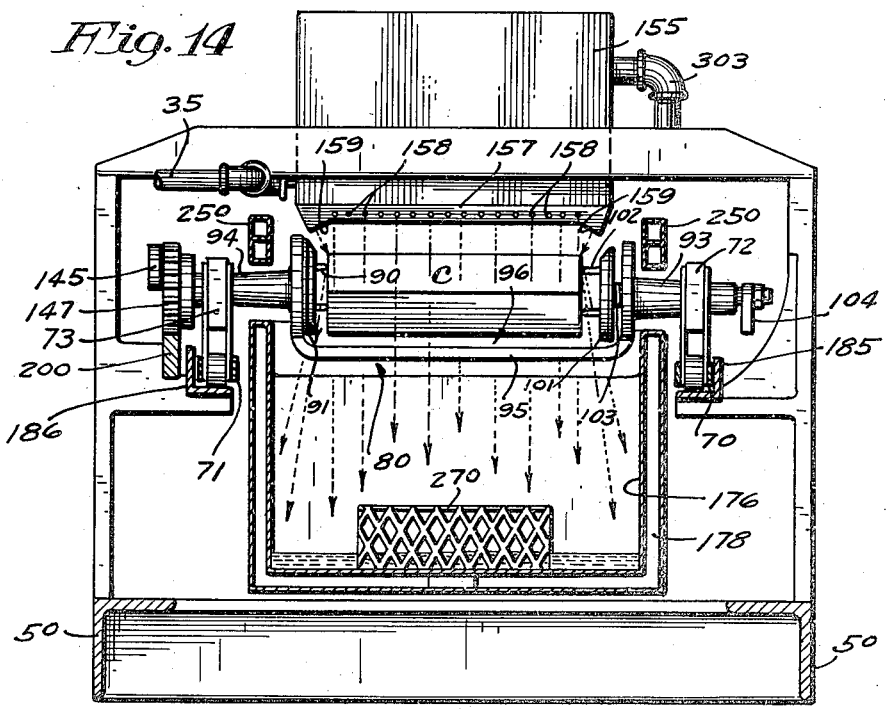
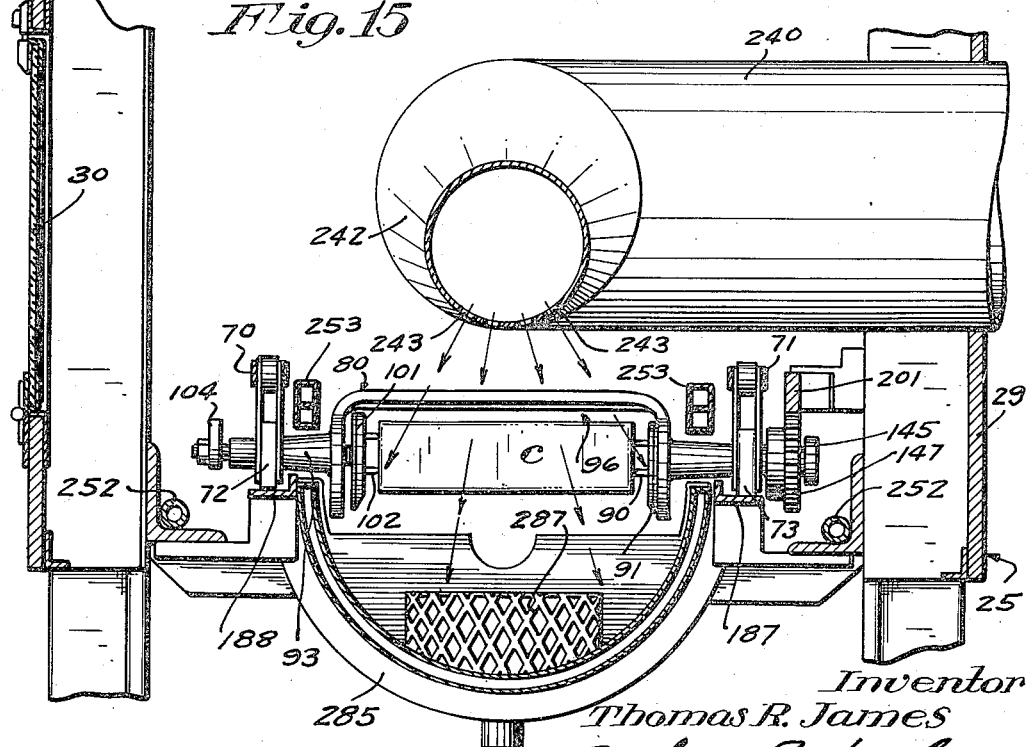

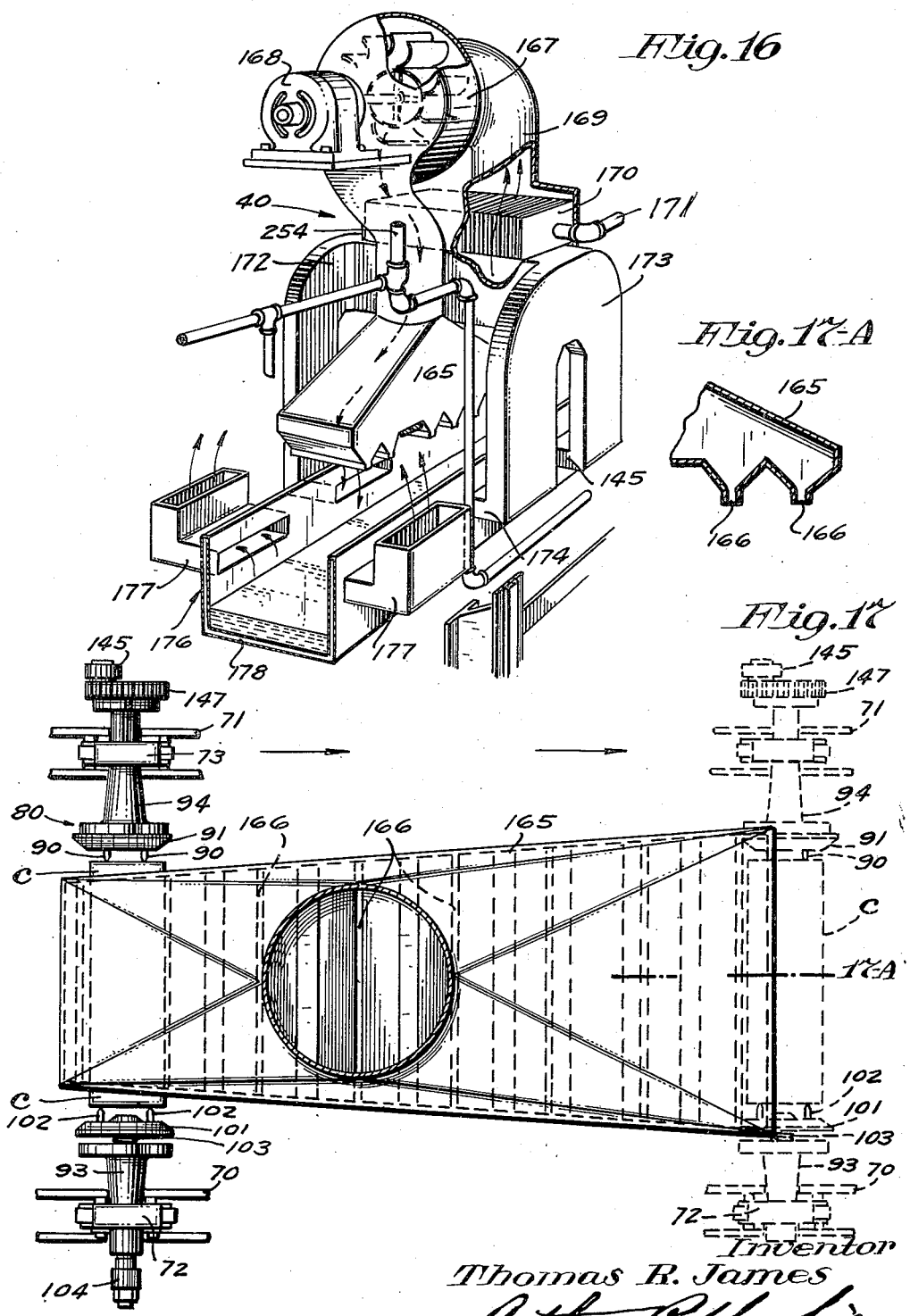

Sept. 21, 1943.  T. R. JAMES  2,330,124
APPARATUS FOR WAXING CARTONS
Original Filed Oct. 12, 1940   14 Sheets-Sheet 12

Inventor
Thomas R. James
By Arthur R. Uby Atty.

Sept. 21, 1943.  T. R. JAMES  2,330,124
APPARATUS FOR WAXING CARTONS
Original Filed Oct. 12, 1940  14 Sheets-Sheet 13

Inventor
Thomas R. James
By Arthur C. Uy Atty.

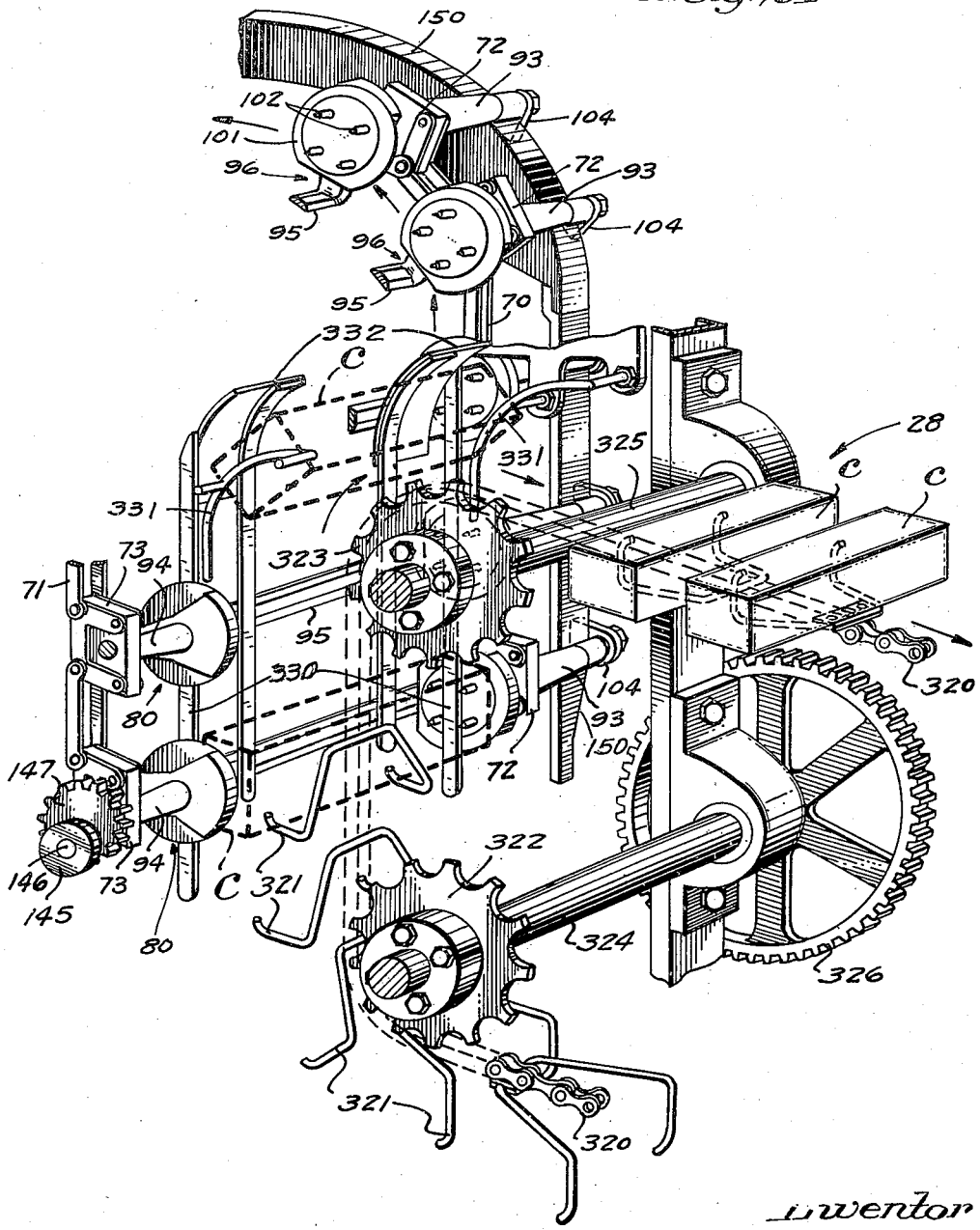

Patented Sept. 21, 1943

2,330,124

UNITED STATES PATENT OFFICE 2,330,124

APPARATUS FOR WAXING CARTONS

Thomas R. James, Minneapolis, Minn., assignor to General Mills, Inc., a corporation of Delaware Original application October 12, 1940, Serial No. 360,875. Divided and this application May 31, 1941, Serial No. 396,205

5 Claims. (Cl. 91—55)

This is a division of my application Serial No. 360,875, filed October 12, 1940.

An object of this invention is to provide an apparatus for efficiently waxing cartons particularly those having a length much greater than their other dimensions and overlapping closing flaps on the ends so as to give the carton a smooth coat and to fill all gaps left in sealing the cartons.

Another object is the provision of means for applying a relatively thin smooth coating of wax to cartons of Kraft paper board to seal the cellulose fibers composing the same to render the carton moisture resistant so that it may enclose and protect a hygroscopic material as a precooked breakfast food from the entrance of moisture.

Another object is to apply more wax than is needed and to remove the excess while still in a molten state and to properly distribute this coating over the surface of the carton.

Another object is to keep this coating in motion until it solidifies so as to prevent the formation of a rough uneven coating.

These and other objects as will hereinafter appear, are accomplished by this invention which is fully described in the following specification and shown in the accompanying drawings in which Figure 1 is a perspective view of apparatus embodying the invention;

Figs. 2, 2—A and 2—B taken together form an enlarged longitudinal vertical section through the waxing machine;

Fig. 3 is a partial perspective view of the apparatus for feeding uncoated cartons to the machine.

Fig. 4 is a partial enlarged vertical sectional view on the line 4—4 of Fig. 3;

Fig. 5 is a horizontal sectional view on the line 5—5 of Fig. 3;

Fig. 6 is an enlarged sectional view similar to Fig. 4 but showing the parts in more detail;

Fig. 7 is a partial enlarged detail of one of the pins shown contacting a carton;

Fig. 8 is a partial perspective view of the upper end of one of the cartons showing the outer end flap open;

Fig. 9 is a partial perspective view showing the waxing apparatus with the sprinkler in action;

Fig. 10 is a partial enlarged vertical section through the sprinkler;

Fig. 11 is an enlarged perspective view of the sprinkler as viewed from beneath;

Fig. 12 is an enlarged diagrammatic view showing a preferred form of the invention in which the carton is rotated about its longitudinal axis continuously during the time molten wax is sprinkled thereon;

Fig. 13 is a similar view showing a modified form of the device in which the carton is moved beneath the sprinkler without rotating while two longitudinal surfaces and the ends of the carton are sprinkled, the carton then being rotated through 90° while the other two longitudinal surfaces and the ends of the carton are sprinkled;

Fig. 14 is a partial enlarged vertical section on the line 14—14 of Fig. 2-A;

Fig. 15 is a partial enlarged vertical section on the line 15 of Fig. 2-B;

Fig. 16 is a partial perspective view of the apparatus for blowing excess molten wax from the carton;

Fig. 17 is an enlarged partial top plan view of the air pressure box showing its relation to the carton as it passes thereunder;

Figure 2:
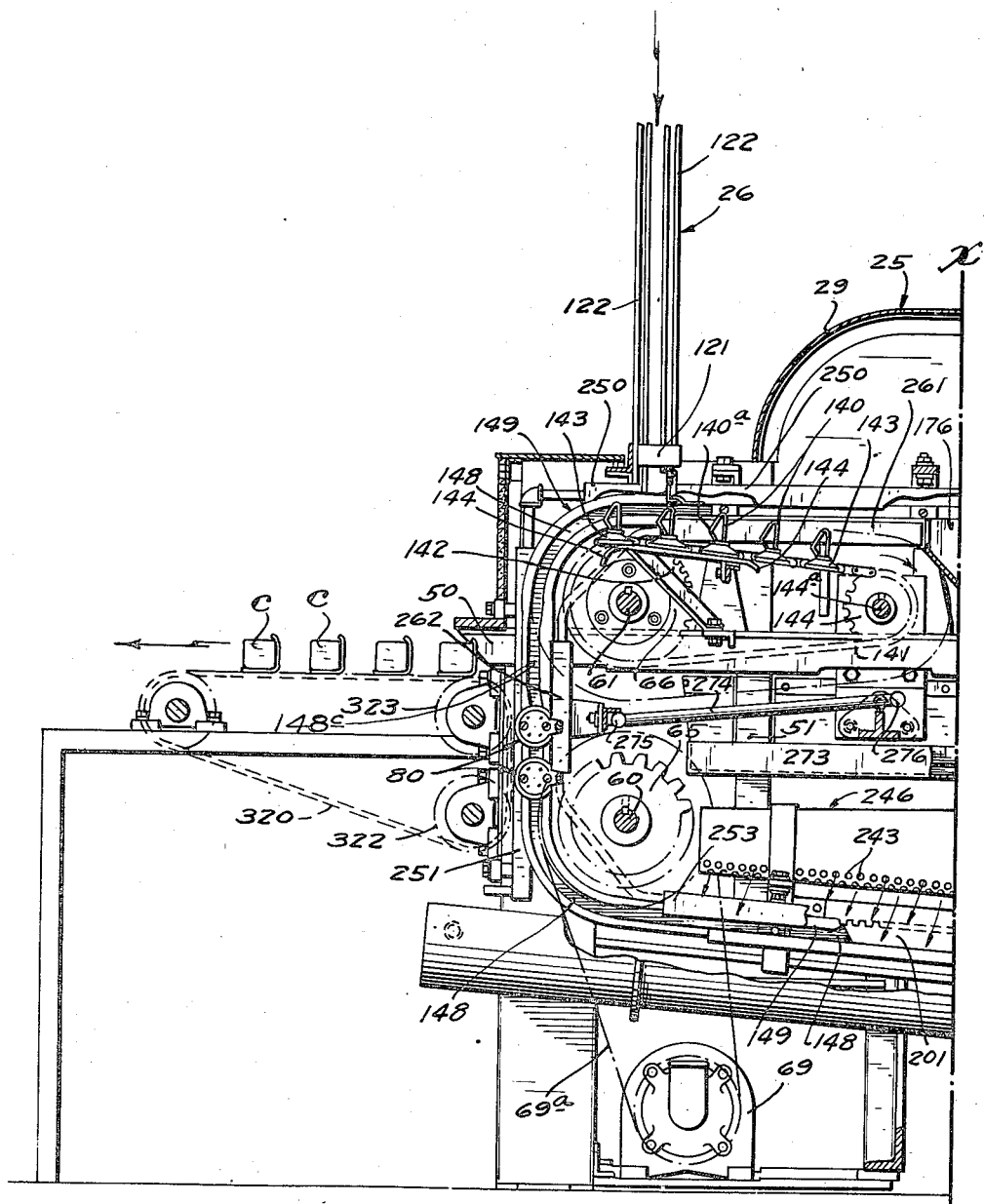
Figure 18:
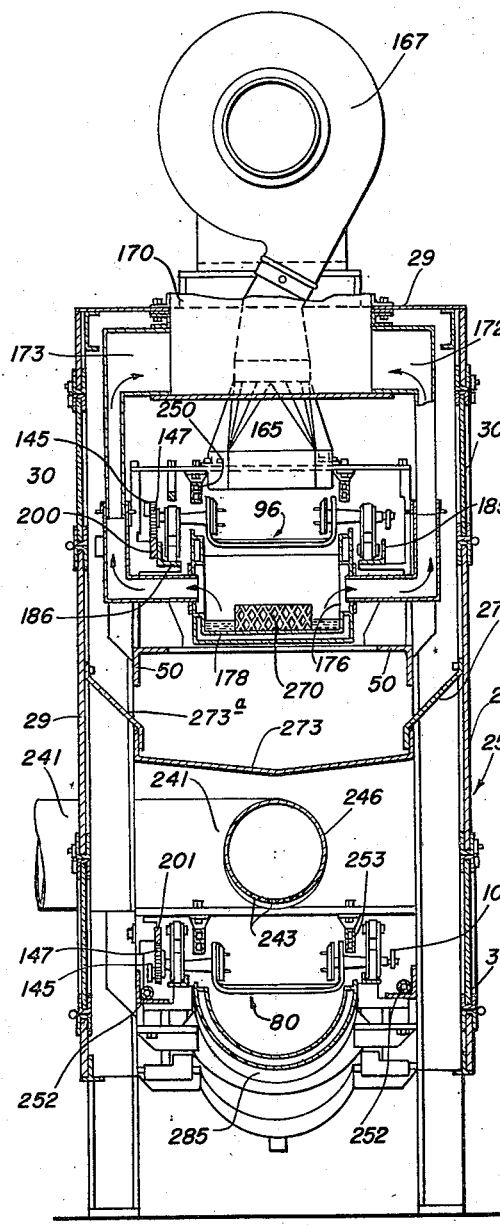
Figure 19:
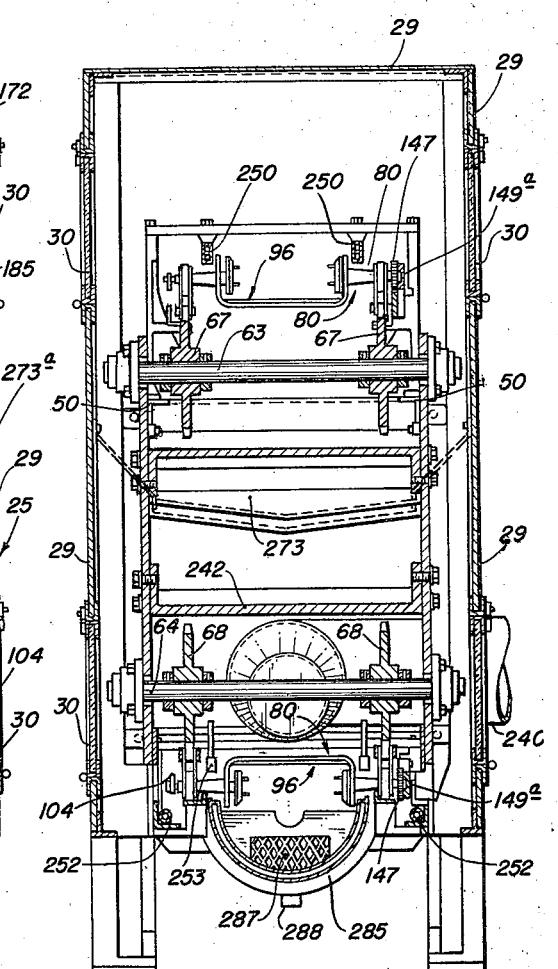
Figure 20:
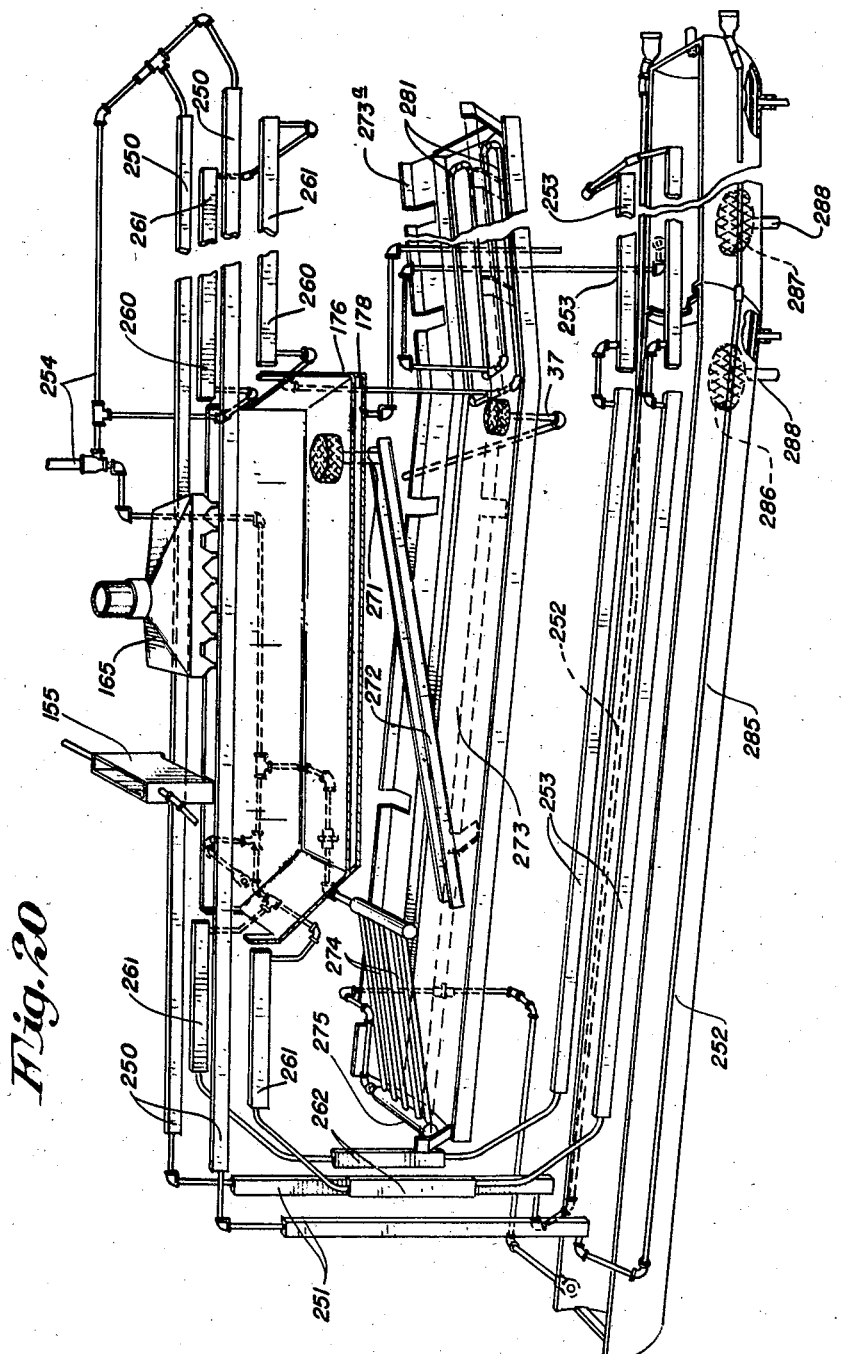

Fig. 17-A is a partial vertical section on the line 17—A of Fig. 17;

Fig. 18 is a transverse vertical section on the line 18—18 of Fig. 2-A;

Fig. 19 is a similar section on the line 19—19 of Fig. 2-B;

Fig. 20 is a perspective skeletonized view of means for heating the various elements of the waxing machine; and Fig. 21 is a partial perspective view of the pick-off device on the delivery end of the waxing machine.

The embodiment illustrated comprises a waxing machine 25 (Fig. 1) to which filled and sealed cartons to be waxed are fed through a vertical column 26 from a traveling conveyor 27 while the waxed and cooled cartons are carried away from the machine by means of a conveyor 28. The machine is enclosed by a housing 29 which is provided with windows 30.

Molten wax is fed to this machine through a pipe 35 from a wax heater unit 36, the excess wax which is blown off the carton, as will later be described, is caught by suitable heated pans and returned in a molten condition to the heater unit 36 through a suitable pipe 37. An air blast unit 40 which is shown in perspective in Fig. 16 serves to blow off the excess coating of wax as will later be described. Air for cooling the cartons and for setting the wax thereon is passed through an air-cooling unit 45 which may cool the incoming air if desired, the air passing through a suitable fan 46 (driven by a motor 47) to the interior of the waxing machine 25.

The waxing machine, shown in vertical longitudinal section in Figs. 2, 2—A and 2—B, comprises a frame having longitudinal members 50 carried on suitable supports as 51, 52 and 53. A chain for conveying cartons through the machine is carried by a series of shafts 60, 61 (Fig. 2), 63 and 64 (Fig. 2—B) which are suitably journalled in the frame of the waxing machine and carry spaced pairs of sprockets 65, 66, 67 and 68, respectively. The shaft 60 is driven by means of a motor 69 and a chain 69ª through a suitable gear reduction. The shafts 63, 64 are mounted on bearings (not shown) which are movable to the right to serve as a take-up on the chains.

Gripper units

Endless chains 70, 71 (Fig. 17) pass around these sprockets and carry suitable bearings 72, 73, preferably of the universal ball type as shown in Fig. 6, in which are suitably journalled a series of gripper assemblies or units 80. Each gripper unit is adapted to grip and hold a carton C to be waxed. This carton is preferably of an elongated type having end flaps 81, 82 and 83, the latter being coated with glue on its under side so that when pressed down it will firmly adhere to the flaps 81 and 82. Much depends upon the proper closing and sealing of these cartons so as to get a substantially moisture-proof package after it has been waxed. It will be observed that the ends of these cartons, where pressure is applied for gripping the same, consist of a plurality of overlapping flaps which aid materially in taking the necessary end pressure and also for reducing any danger of a poor seal occurring where the points of the grippers contact the carton.

The gripping of the ends of this carton, which is preferably much longer than its other two dimensions, is accomplished by means of stationary pins 90, preferably four in number, and carried by a plate 91 secured to the frame of the gripper unit as by means of screws 92. This gripper unit has aligned end portions 93 and 94 connected by an off-set integral portion 95 which provides a suitable space 96 for the reception of the carton C so that the longitudinal axis of the carton is substantially coincident with the axis of the end portions 93, 94 of the gripper unit. Thus no strain is thrown on the carton and the two sets of pins are always in alignment.

Passing axially through the end 93 and slidably mounted therein is a short shaft 100 on the inner end of which is mounted a plate 101 which carries pins 102 similar to the pins 90. The plate 101 is pressed inwardly by means of a compression spring 103 while the outer end of the shaft 100 carries a cam follower 104 which engages a suitable cam, as will later be described, as the gripper unit moves through the machine to withdraw the pins 102 for the insertion of the cartridge after which the spring 103 returns the pins so as to grip the cartridge and to hold it during the waxing as will later be described.

The pins 90 of Fig. 6 are shown in detail in Fig. 7 and are preferably made with a screw threaded portion 110 with a hollow center 111 terminating in the hollow tapered end 112. A central pin 113, preferably a phonograph needle, is held therein by means of a driving fit and this terminates in a tapered point 114 which makes contact with the end of the carton with sufficient pressure to depress the carton and perhaps to pierce it slightly at the point C'.

Carton inserting mechanism

The mechanism for inserting the unwaxed cartons into the gripper units will now be described. This is shown generally in Figs. 1 and 3 and consists of a column 26 which is kept filled with the unwaxed cartons which are fed in by means of a conveyor 27 from a carton closing and sealing machine, which is prevented from becoming empty by an automatic stop on the carton inserting mechanism (not shown). This column comprises vertical members 120 to which are secured at suitable intervals box-like spaces 121 to which are secured vertical guide rods 122 which serve to guide the cartons C as they descend.

At the bottom of this stack, the lowermost carton rests upon spaced horizontal guides 130 (Fig. 3). In front of the next to the lowest carton in the stack I have placed a yieldable retainer 131 hingedly mounted at 132 on a bracket 133 on a cross member 134 secured to the main frame. A spring 135 yieldably holds the retainer in the position shown in which a vertical wall 136 serves as a guide for the stack of cartons as it is lowered and retains next to the lowest carton in place as the lowermost is moved out as will presently be described. A horizontal bottom of the retainer carries two horizontal flexible guides 137 which are spaced above the guides 130 a distance slightly less than the vertical height of a carton. The spring 135 tends to hold the next carton against the vertical guides and the flexible guides 137 tend to grip the carton as it is fed forward so as to insure its being forced against the face of the next flight for proper registration with the gripper unit. An adjusting screw 138 serves to fix the normal position of the retainer 131.

In order to bring each carton into registration with the gripper unit so that it can be gripped at its ends, I have provided a series of feed-in flights 140 (Fig. 3) which are carried on suitable chains 141 which are driven by sprockets 142 on the shaft 61, the flights having shoes 143 which slide on guides 144, so that the flights remain in registration with the conveyor chains 72, 73 at the instant the carton is in alignment with the axis of the gripper unit. The forward ends of the feed-in chains 141 pass over sprockets 144 on a shaft 144ª, so that the chain 141 drops away from the chains 70, 71 as the chains advance and after the carton has been gripped. Thus, as the flights 140 advance, they force the lowermost carton from beneath the stack while the next carton is held in the stack by the retainer 131. Should the lowermost carton or the next above it become jammed, the retainer will yield to prevent damage to the machine. The back of each flight has a rearwardly inclined surface 140ª which, as the flight moves out from beneath the next carton, permits that carton to slide down this surface as the flight advances, thereby insuring that the next carton will descend without turning and that it is in proper register with the gripper unit.

As the gripper units 80 (Figs. 4 and 6) approach the point where the cartons are fed to the conveyor, these gripper units are held in registration so that the central bar portion 95 will be lowermost to receive the carton. This is accomplished by means of a cam follower roller 145 journalled on a pin 146 on the side of a gear 147 (Fig. 21), the latter being keyed on the end of the extension 94 of the gripper unit. This cam follower engages a suitable groove 148 in a stationary cam 149 (Fig. 2) which insures the gripper unit remaining in the desired position during the instant of gripping the carton. The gear 147 engages a rack for rotating the carton, as will later be described together with the two methods of sprinkling the carton with wax as shown in Figs. 12 and 13.

Just before the gripper unit reaches a point at which the carton is to be inserted, the cam follower 104 rides up over the stationary cam 150 (Figs. 3 and 4) which withdraws the plate 101 with its associated pins so that the carton may be inserted. Immediately after this, the cam 150 is cut away at 150ª permitting the plate 101 to be pressed inwardly so that its pins engage the end of the carton to grip it while the carton is properly positioned by means of the flights 140. At the same time, as shown in Fig. 2, the feed-in flights 140 begin to be depressed so as to be gradually withdrawn from contact with the carton. During this time, the guides 130 and 137 insure the carton being held in the right horizontal position with respect to the gripper unit.

*Sprinkler unit*

As the chain carrying the cartons leaves the point at which the carton is gripped, it passes beneath the sprinkler 155 which is shown in detail in Figs. 9, 10 and 11. The sprinkler preferably consists of a can having inclined bottom surfaces 156 and 157 having a series of holes 158 which tend to direct streams of molten wax forwardly and backwardly of the line of travel of cartons, as best shown in Figs. 12 and 13 which illustrated alternative methods of rotating the carton as will later be described. This can also has inwardly inclined surfaces 159 at its ends in which are located holes 160. Thus the streams of wax from the holes 158 fall directly on the longitudinal sides of the carton while the streams from the holes 160 fall particularly on the ends of the carton, thus insuring a complete coating of the carton. In this connection, it will be noted in Fig. 4 that the pins extend well beyond the ends of the carton and that the plates 91 and 101 are placed well back with the pins extending beyond them so as to insure a complete waxing of the ends of the carton. The method of withdrawing these pins so as to prevent damage to the wax coating of the cartons will later be described.

*Air blast unit*

The wax coating as initially applied is much heavier than that which is desired for the finished package, but unless removed much of this would remain on the carton and would not only fail to insure a good moisture seal for the carton but would be likely to adhere to anything which it touched and upon withdrawal would peel off some of the coating thereby rendering that portion of the carton subject to the entrance of moisture. This is particularly true of cartons of the type here considered in which the cartons are made of Kraft fibreboard made up of relatively long strands of cellulose fibre which extend beyond the surface of the board and which act very much like pipes for drawing in moisture unless the ends of these fibres are very carefully sealed.

Referring now particularly to Figs. 2—A and 16, air is directed preferably downwardly over the cartons which are rotating as will later be described by means of an air blast housing 165 having in its bottom a series of transversely extending slots 166 which are preferably spaced at about the spacing of the carton so that as the latter is rotating while passing beneath these slots, the air issuing therefrom will tend to blow off the excess molten wax. These slots are of varying length being shorter than the length of the carton, as shown in Fig. 17, at the near end of the housing 165 and longer than the carton as the latter leaves the housing. This has a tendency to blow the molten wax toward the ends of the cartons. The slots at the near end of the housing are preferably narrower than at the leaving or wider end so that the air blast is greatest where the wax coating is thinnest. The combination of the rotation of the carton and the air blast smooths the coating of liquid wax.

Air is supplied to the housing 165 by a fan 167 which is driven by an electric motor 168. The fan receives air through an intake 169 which is preferably supplied with an air-heating unit 170 to which steam or hot water may be supplied through a pipe 171 for warming the air. This intake is preferably bifurcated with passages 172 and 173 and each of these is preferably divided and has openings 174 and 175 from each side leading into the sides of a box 176 located immediately beneath the bottom of the housing 165. Thus the air blast issuing from the slots 166 passes downwardly over the revolving cartons blowing off the excess molten wax which is then caught by the box 176 while much of this air is returned to the fan 167 through the openings 174 and 175. I have also provided additional breather tubes 177 which permit air to pass up through the box 176 but which serve to catch and return any molten wax which may be present particularly in the form of spray. The box 176 is provided at its sides and bottom with a steam jacket 178 and forms part of the system for keeping this wax in liquid state, as will later be described.

Referring to Fig. 17 it will be seen that the housing 165 at the left or entering end of the carton C is narrower than the carton is long while at the right-hand end this housing is wider than the length of the carton. This has the effect of forcing some of the molten wax toward the ends of the carton and gives a more uniform distribution of the coating.

During its passage through the upper portion of the waxing machine, the chains 70 and 71 slide on angle irons 185, 186 (Fig. 14). Referring to Fig. 15, it will be seen that on the return the bearing members 72, 73 slide upon and are guided by angle irons 187, 188. All these guides are well lubricated by the molten wax which is present.

The cartons are preferably rotated continuously during the operation of sprinkling or otherwise coating them with a molten wax, the rotation continuing during the operation of blowing off the excess wax and during the entire operation of the setting of the wax since this aids materially in giving a smooth and even coating. This is accomplished by providing the machine with a rack 200, as shown in Fig. 2—A. This lies in the path of the gears 147 (Fig. 4) thereby causing the gears and the gripper units 80 to revolve as the chain advances. This rack is preferably continued to a point near the sprocket 67 at the right-hand end of the machine, as shown in Fig. 2—B, at which point a stationary cam having a cam groove 149ª is provided at the end of the machine for engagement with the cam follower rollers 145 on the gripper units thereby preventing rotation of these grippers until after they pass the sprockets 68. Here the cam groove 149ª stops and a rack 201 begins for rotating the cartons while they are further cooled as will now be described. The rotation of the carton while the wax is still molten causes more of the wax to flow to the corners of the carton where it is most needed because of the cracks in the carton at that point due to the bending, thereby insuring a better wax seal. The wax will not usually have set before the grippers leave the rack 200. Additional cooling is therefore needed. Moreover, it is desirable that additional cooling be supplied to chill the cartons below the point where the wax will set. Among other advantages derived from this cooling is the fact that the cartons can readily be handled without danger of the wax thereon sticking to other cartons or to apparatus with which it comes in contact.

To accomplish this cooling, I have provided the fan 46 which receives air through a pipe 210, the air then passing through the air-cooling unit 45 which contains a water-cooling unit 211 for cooling the air; this unit receives water from a suitable source through a pipe 212 and its flow is controlled by a valve 213. Thus, the air fed to the machine will be of constant temperature with little attention of an operator.

The air cooled by the unit 45 passes through the fan 46 and divides through the tubes 240, 241 (Fig. 1) where it is fed to the bottom of the waxing machine as shown in detail in Figs. 2, 2—A and 2—B. The tube 240 (Figs. 2—B and 15) leads to a longitudinal distributing tube 242 which has a series of holes 243 on its lower surface and is closed at the ends so that the cooled air delivered thereto is forced down over the cartons C as shown in Fig. 15. Likewise, the tube 241 connects with the longitudinal distributing tube 246 which preferably extends both ways from the center and is supplied on its lower surface with holes similar to the holes 243.

The wax on the cartons will not have become solid before it reaches the sprocket wheels 67 of Fig. 2—B. Hence, the cooling of the carton by air from the tubes 242 and 246 may complete the setting of the wax on the cartons and also, in any case, produces cooling to a point slightly below that at which the wax normally sets. The rack 201 engaging the gears 147 serves to rotate the cartons during this cooling operation so as to insure their uniform cooling. This rack terminates before reaching the sprockets 65 as shown in Fig. 2. A cam having the cam groove 148 insures the non-rotation of the carton grippers as they pass the sprockets 65 and 66. The carton is released and removed from the chain grippers at a point between these sprockets as will later be described.

A system for catching wax which is blown from the cartons, or which drops therefrom, and for keeping the chains warm is shown in Fig. 20. The grippers are kept warm by a series of steam-heated radiators, preferably of rectangular cross-section which lie alongside their ends. Thus, radiators 250, 251, 252 and 253 are arranged in pairs outside the grippers and closely adjacent thereto, these radiators being connected by pipes to each other and to pipes 254 which receive steam from a suitable source. Parallel to these radiators are shorter radiators 260, 261 and 262 which lie alongside the chains themselves to keep them warm and prevent molten wax from congealing thereon.

Beneath the sprinkler 155 and the air blast housing 165 is located the box 176 which is preferably steam jacketed so that the molten wax from the sprinkler and that blown down by the air jet will be caught in the box and since it is kept warm will remain liquid and will flow through a screen 270 and pipe 271 and chute 272 to a pan 273 which is located beneath and which has a splash apron. Over this pan at the left-hand end, as shown in Fig. 20, is a series of spaced parallel steam pipes 274 which are connected to headers 275, 276 and these are connected through suitable pipes 277 with the pipe 254 which lead to the steam source. These pipes form a radiator that keeps the feed-in mechanism from accumulating wax.

At the right hand end of the pan 273 there is a series of pipes 281 which also connect to one of the pipes, carrying steam to any desired point. The pipes 281 keep this end of the pan warm so that any wax falling therein will be kept molten. The molten wax from the pan 273 then passes through a pipe 37 and flows back to the wax melting unit preferably by gravity. A trough 285 is steam jacketed throughout, steam being applied to the steam jacket of this trough at any desired point. This trough is provided with screens 286, 287 and the drip of wax from the boxes while being cooled is drained therefrom through pipes 288.

Referring now to Fig. 9, the pipes 288 lead to the heater unit 36, preferably through a pump 289, the pipe discharging into a tank 290, and at the bottom of which is preferably located a series of steam coils 291 for maintaining the wax therein in a molten condition and for heating the unit 36 generally.

The heater unit 36 is provided with a pump 295, which is driven by a motor 296 and has an intake 297 leading into the tank 290, the delivery pipe 298 from the pump leading to a reservoir 299. The pipe 298 is preferably bifurcated at 300, each arm leading into strainers 301 located in the reservoir so that any particles of solid material which are too large to pass through the wax sprinkler will be caught thereby. An overflow pipe 302 leads from the reservoir 299 to the tank 290 and serves to fix the level of liquid in the reservoir.

The pipe 35 leads from the reservoir to the sprinkler 155 and is of sufficient size to carry most of the liquid wax which will then be distributed by the sprinkler. The liquid level of the sprinkler is fixed by an over-flow pipe 303 which delivers into one of the breather tubes 177.

Thus it will be seen that I have provided a simple and efficient means for keeping the wax molten and in circulation so that considerable quantities of it will be delivered to the cartons as they pass beneath the sprinkler and as the excess runs off or is blown off it will be caught by suitable boxes and pans placed therebeneath and to return it to the heater unit.

At the same time I have provided a simple and efficient means for maintaining the temperature of the gripper units, as shown in Fig. 6, sufficiently warmed so that the tapered points 114 will be kept at a temperature above the melting point of the wax. This is done by means of radiant heater pipes 253. As a result of the cooling, the wax 310 (Fig. 7) will be cooled as it passes through the machine to a point where it solidifies, while wax 311 adjacent the point 114 will be kept molten at that point up to the time the points are withdrawn. Upon withdrawing the points this wax 311 will also quickly solidify, since the rest of the carton is cooled and only a small amount of it is kept molten by the point. This enables the wax at this point to seal completely.

If the point 114 was not kept warm but was allowed to cool with the wax, upon withdrawing the point some of the wax would come away with the point and would break the continuity of the wax coating of the surface, thereby permitting air to enter.

The construction of the carton also materially aids in this respect. Thus the carton C at the ends is preferably made up of the three overlapping flaps 81, 82, 83 as shown also in Fig. 8. While the pressure applied by the points 114 is not great, the paper used for this purpose is as light as can be conveniently worked, namely .009 inch in thickness. The fact that I am able to use a carton having overlapping flaps at its ends which are connected together, as shown, by means of glue, causes the flaps to reinforce each other so that the pressure required to hold the carton does not seriously deform its surface. Upon release of the points there is, therefore, no substantial change in the form of the end of the carton which further prevents the breaking or cracking of the wax coating of the ends.

While I prefer to have the gears 147 engage the rack 200 during the entire time, it is under the sprinkler 155, and continuously thereafter until after it passes the housing 165 and later, it is not essential for a complete sprinkling of the carton that it be so rotated, as shown in Fig. 12.

In Fig. 13 is shown an alternative form of device for turning the carton under the sprinkler which differs from the device of Fig. 12 in turning the carton only through 90°. To do this the roller 145 follows the cam groove 148 and at 148ᵇ this turns down so as to rotate the carton 90° as shown in Fig. 13 thus causing all four sides of the carton to be sprinkled.

The pick-off device

Figure 1:
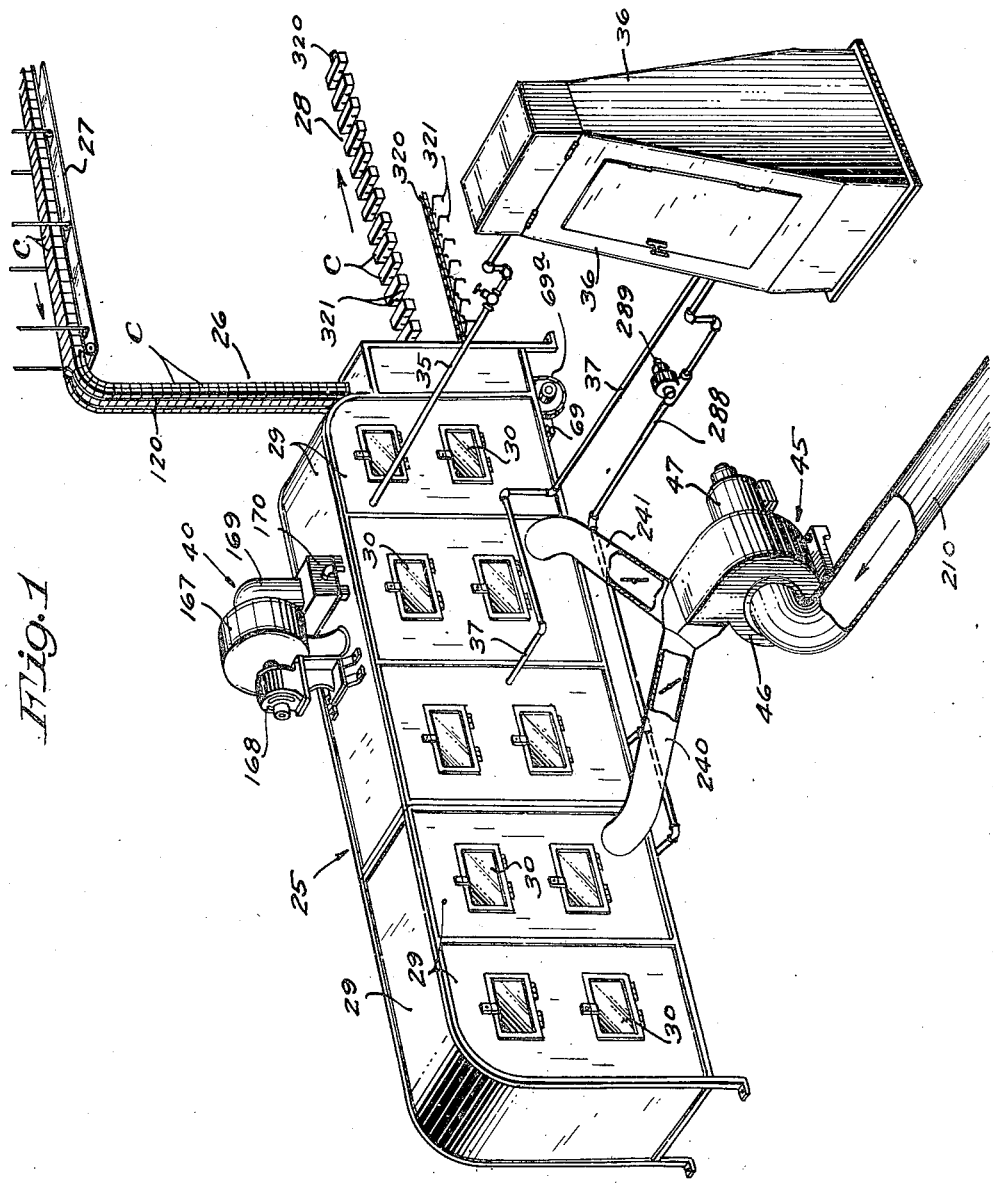

Referring to Fig. 21, a chain 320 is provided with pick-off fingers 321 and passes around sprockets 322, 323 on shafts 324, 325, respectively, which are suitably journalled in the frame of the machine at the entering end, as shown in Fig. 1. The shaft 324 is driven by a gear 326 which is driven by suitable gears (not shown) from the mechanism which drives the chains carrying the grippers, at a speed somewhat greater than that of the grippers, so that the pick-off fingers pass beneath each carton at the instant the gripper releases the carton, so that the pick-off fingers thus receive the carton at the instant it is released, and carry it up and over the sprocket 323 and out and away from the machine as shown in Fig. 1. Release of the carton is accomplished by the follower 104 of Fig. 6 riding up on the cam 150 of Fig. 21. Side guides 330 and 331 and back guides 332 serve to support and guide the cartons when they are released. The cartons are also rotated somewhat as shown in dotted lines opposite the guides 331 by the cam follower rollers 145 following the groove 148ᶜ of Fig. 2.

Thus it will be seen that I have provided a very simple and efficient means for wax coating cartons and one which insures that the coat is both uniform and of sufficient thickness to render the carton substantially moisture proof, particularly for the purpose intended of sealing a carton which has been filled with a hygroscopic material, like a breakfast food, which when sealed is avid for moisture, and which must be kept so in order to make it palatable and nutritious.

While I have shown and described but a few embodiments of my invention, it is to be understood that it is capable of many modifications. Changes, therefore, may be made which do not depart from the spirit and scope of the invention as defined in the appended claims.

I claim as my invention:

1. Apparatus for waxing closed and sealed paper cartons comprising means for continuously moving the cartons through the machine, means for sprinkling the outer surfaces of the cartons with an excess of molten wax, means for continuously rotating each carton about its longitudinal axis in a horizontal plane while being sprinkled with molten wax, and means including a plurality of narrow slits parallel to the axis of rotation of the carton for directing a plurality of blasts of air downwardly about the entire length of said cartons to blow off excess molten wax.

2. Apparatus for waxing closed and sealed paper cartons comprising means for continuously moving the cartons through the machine, means for sprinkling the outer surfaces of the cartons with an excess of molten wax, means for continuously rotating each carton about its longitudinal axis in a horizontal plane while being sprinkled with molten wax, and means including a plurality of narrow slits extending substantially parallel to the axis of rotation of the cartons, the first slits encountered by the cartons being shorter than the cartons, while the latter slits are longer than the cartons for directing a plurality of blasts of air about said cartons to blow off excess molten wax.

3. Apparatus for waxing closed and sealed paper cartons comprising means for continuously moving the cartons through the machine, means for sprinkling the outer surfaces of the cartons with an excess of molten wax, means for continuously rotating each carton about its longitudinal axis in a horizontal plane while being sprinkled with molten wax, means including a fan for directing a blast of air about said cartons to blow off excess molten wax, means for heating said air blast, and an intake for the fan adjacent the cartons for withdrawing the heated air after it has passed the waxed cartons.

4. In a machine for waxing closed and sealed paper cartons, having a length much greater than its other dimensions and having a plurality of overlying end flaps glued together, means for gripping the carton including pins engaging said overlying flaps, means for waxing the carton while so gripped, means for cooling the carton so as to set the wax, means for radiantly heating the gripper pins so as to keep the wax adjacent thereto molten, and means for withdrawing the pins to release the carton while the wax adjacent the pins is still molten.

5. Apparatus for waxing closed and sealed paper cartons comprising means for continuously moving the cartons through the machine, means for sprinkling the outer surfaces of the cartons with an excess of molten wax, means for continuously rotating each carton about its longitudinal axis in a horizontal plane while being sprinkled with molten wax, means for directing a plurality of blasts of air about the entire longitudinal surfaces of said cartons and parallel to the length thereof to blow off excess molten wax while being rotated, the air blasts being directed downwardly over said cartons as they pass beneath the same, and means for increasing the intensity of the air blasts as the carton advances.

THOMAS R. JAMES.